(No Model.) 2 Sheets—Sheet 1.
H. W. LEONARD.
AUTOMATIC BELT SHIFTER.
No. 313,505. Patented Mar. 10, 1885.
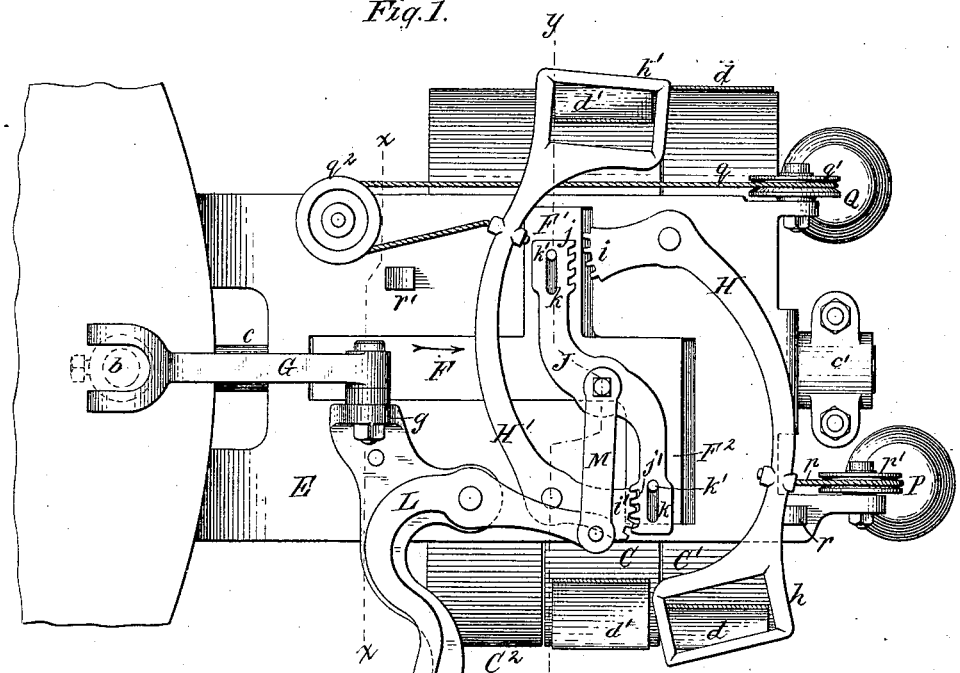
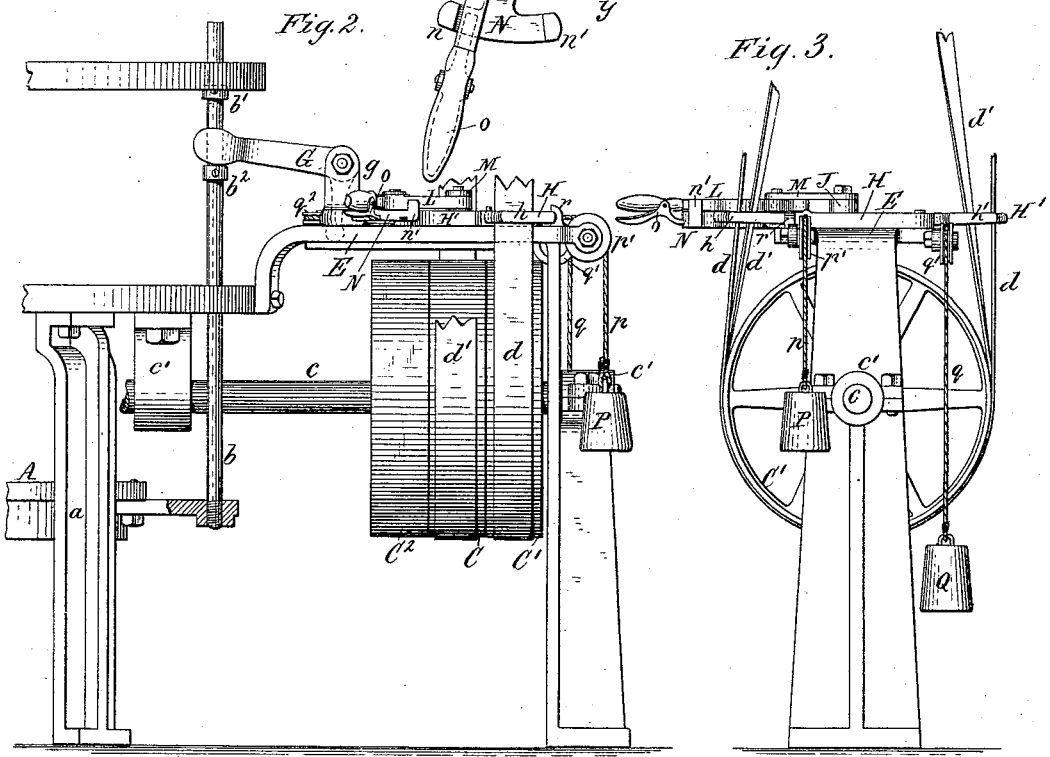
Witnesses: Chas. J. Buchheit, Theo. L. Popp
H. W. Leonard, Inventor.
By Wilhelm & Bonner, Attorneys.

(No Model.) 2 Sheets—Sheet 2.
H. W. LEONARD.
AUTOMATIC BELT SHIFTER.
No. 313,505. Patented Mar. 10, 1885.
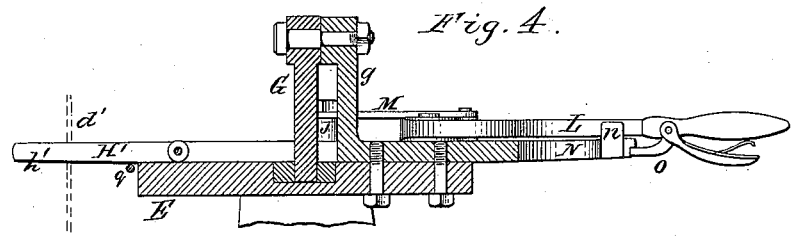
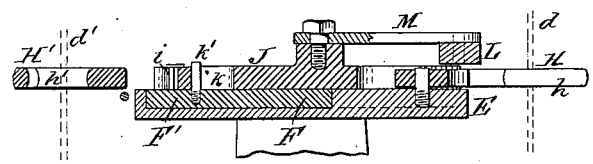
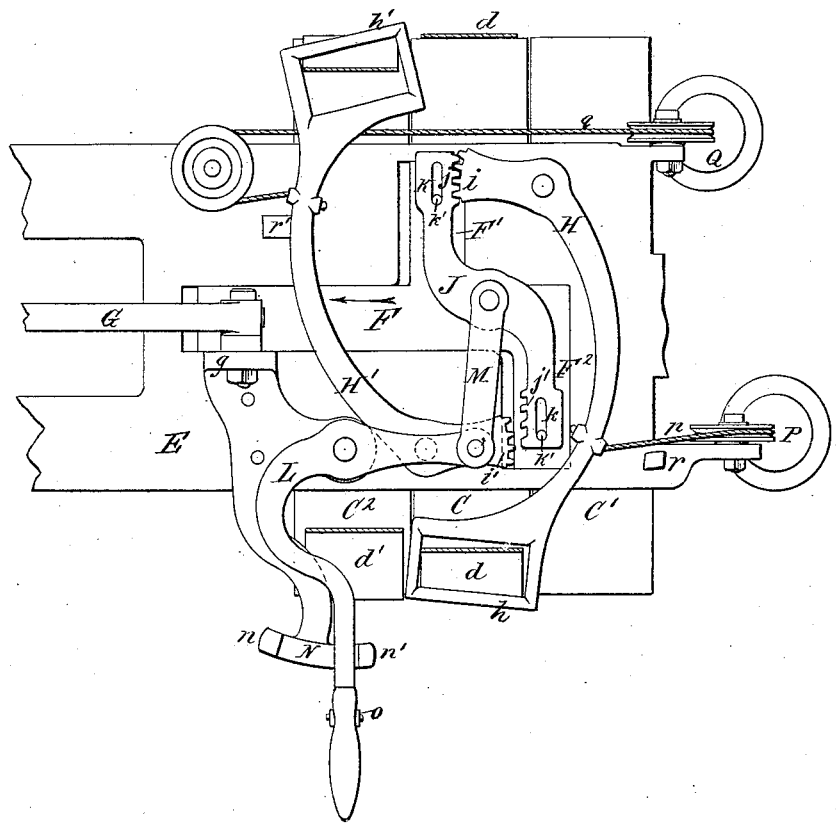
Witnesses: Chas. J. Buchheit, Theo. L. Popp
H. W. Leonard, Inventor.
By Wilhelm Bonner,
Attorneys.

UNITED STATES PATENT OFFICE.

HENRY W. LEONARD, OF SYRACUSE, NEW YORK, ASSIGNOR TO THE SYRACUSE PAPER WARE COMPANY, OF SAME PLACE.

AUTOMATIC BELT-SHIFTER.

SPECIFICATION forming part of Letters Patent No. 313,505, dated March 10, 1885.

Application filed July 21, 1884. (No model.)

*To all whom it may concern:*

Be it known that I, HENRY W. LEONARD, of Syracuse, in the county of Onondaga, in the State of New York, have invented a new and useful Improvement in Automatic Belt-Shifters, of which the following is a specification.

This invention relates to an improvement in that class of automatic belt-shifters which are employed in connection with power-presses and other machines for automatically arresting the motion of the machine at the proper time.

The object of my invention is to produce a simple and reliable device of this character; and my invention consists of the improvements which will be hereinafter fully set forth, and pointed out in the claims.

In the accompanying drawings, consisting of two sheets, Fig. 1 is a top plan view of my improved belt-shifter. Fig. 2 is a side elevation, and Fig. 3 an end elevation, thereof on a reduced scale. Fig. 4 is a longitudinal section in line $x\,x$, Fig. 1. Fig. 5 is a cross-section in line $y\,y$, Fig. 1. Fig. 6 is a plan view of the shifting device in the opposite position.

Like letters of reference refer to like parts in the several figures.

A represents the follower of a power-press, or any other movable part of a machine the motion of which is to be controlled by the automatic belt-shifter.

In the construction represented in the drawings, the follower A moves vertically between posts or guides $a$, and is provided with a vertical rod, $b$, provided with two stops, $b'\,b^2$. It is obvious that these stops may be attached to the movable part of the machine in any other suitable manner.

$c$ represents the horizontal driving-shaft, journaled in bearings $c'$, and provided with a tight pulley, C, and two loose pulleys, $C'\,C^2$, arranged on opposite sides of the tight pulley C.

$d$ represents a straight belt, and $d'$ a cross-belt, arranged side by side and running around said pulleys.

E represents a horizontal plate or frame upon which the shifting mechanism is supported and which is attached to the stationary frame of the press or other machine.

F represents a horizontal sliding bar, arranged on the plate E, parallel with the shaft $c$, and guided in a groove or depression formed in the upper side of said plate.

G is a vertical bell-crank lever, pivoted to a standard, $g$, formed on the upper side of the plate E, and connected with its short arm to the inner end of the bar F, while the end of its long arm straddles the rod $b$ between the stops $b'\,b^2$, so that the lever is alternately moved in opposite directions by said stops.

$F'\,F^2$ are two lateral extensions formed on the bar F, and seated in depressions in the plate E, which are made sufficiently wide to permit of a limited lengthwise movement of the bar F on the plate E.

H H' represent the shifting-levers, pivoted to the upper side of the frame E, on opposite sides of the bar F, and provided on the ends of their long arms with loops $h\,h'$, through which the belts $d\,d'$ pass. The short arms of the levers H H' are provided with gear-segments $i\,i'$, respectively.

J represents a shifting-bar, arranged transversely on the bar F, and provided at its ends with gear-racks $j\,j'$, which are adapted to engage with the gear-segments of the shifting-levers. The bar J is provided near its ends with slots $k$, engaging over pins $k'$, which are secured to the lateral extensions $F'\,F^2$ of the bar F, and whereby the bar J is guided in its movements transversely to the bar F.

L represents a horizontal hand-lever, pivoted to the frame E, and having its short inner arm connected to the bar J by a link, M. The outer arm of the hand-lever swings on a bracket, N, which is provided at its outer end with stops $n\,n'$, whereby the movement of the lever is limited. The handle of the lever L is provided with a spring-catch, $o$, which engages in notches on the under side of the bracket N, whereby the handle is locked in position when resting against either of the stops $n\,n'$.

P represents a weight attached to the lever H by a cord, $p$, running around a roller, $p'$, in such manner that the weight will tend to draw the lever in the proper direction to shift the belt $d$ from the tight pulley C to the outer loose pulley, C'.

Q is a similar weight, attached to the lever H' by a cord, $q$, running around pulleys $q'$ $q^2$ in such manner that the weight Q will tend to draw the lever H' in the proper direction to shift the belt $d'$ from the tight pulley C to the inner loose pulley, $C^2$.

$r$ $r'$ are stops formed on the plate E, whereby the movement of the levers H H' is limited.

In the position in which the parts appear in Figs. 1 to 5, the hand-lever L has just been swung against the stop $n$, and the follower A is on its downward course, driven by the crossed belt $d'$, running against the tight pulley C. The stops $b'$ $b^2$ are so adjusted on the rod $b$ that the upper stop, $b'$, will engage the long arm of the lever G, and move it downwardly when the desired downward movement of the follower has been effected. This movement of the lever G moves the bar F outwardly in the direction of the arrow in Fig. 1. The shifting-bar J takes part in this movement of the bar F, whereby the gear-rack $j'$ is disengaged from the segment $i'$, and the rack $j$ engaged with the rack $i$. This movement of the bar J releases the lever H', which is now swung on its pivot by the weight Q, so as to shift the crossed belt $d'$ from the tight pulley C to the loose pulley $C^2$, thereby stopping the movement of the machine. When it is desired to rotate the driving-shaft $b$ in the opposite direction, the hand-lever L is released and swung against the stop $n'$. This movement of the lever L moves the bar J transversely on the bar F, whereby the lever H is so swung on its pivot as to shift the straight belt $d$ from the loose pulley C' to the tight pulley C. The parts now appear in the position represented in Fig. 6, and the follower moves upwardly, driven by the straight belt $d$. This movement continues until the lower stop, $b^2$, strikes the lever G and swings the latter upward, whereby the bar F is moved inwardly in the direction of the arrow in Fig. 6, and the shifting-lever H released, and the lever H' engaged by the bar J. The weight P now moves the lever H so as to shift the straight belt $d$ to the loose pulley C'. In this manner the driving-belt is shifted to a loose pulley, and the movement of the machine arrested automatically when its desired movement in either direction has been accomplished, thereby preventing any movement of the machine beyond the proper point without requiring the care of an attendant after the machine has been set in motion.

It is obvious that springs may be substituted for the weights by which the levers H H' are shifted.

I claim as my invention—

1. The combination, with the movable bar F, of a shifting-bar, J, provided with gear-racks, and shifting-levers H H', provided with gear-segments, substantially as set forth.

2. The combination, with the tight pulley C and loose pulleys C' $C^2$, of a straight belt, $d$, and crossed belt $d'$, movable bar F, shifting-bar J, provided with gear-racks, and shifting-levers H H', provided with gear-segments, substantially as set forth.

3. The combination, with the shifting-levers H H', provided with gear-segments, of the movable bar F, shifting-bar J, provided with gear-racks, hand-lever L, and link M, substantially as set forth.

4. The combination, with the movable bar F, of the shifting-bar J, movable transversely to the bar F, shifting-levers H H', adapted to be operated by the bar J, and a hand-lever, L, whereby the bar J is shifted, substantially as set forth.

5. The combination, with the movable stops $b'$ $b^2$, of the lever G, sliding bar F, shifting-bar J, shifting-levers H H', adapted to be operated by the bar J, and hand-lever L, whereby the bar J is shifted, substantially as set forth.

Witness my hand this 7th day of May, 1884.

HENRY W. LEONARD.

Witnesses:
 AUSTIN D. COOK,
 EDWARD O. WARD.